US006728208B1

(12) United States Patent
Puuskari (10) Patent No.: US 6,728,208 B1
(45) Date of Patent: Apr. 27, 2004

(54) METHOD FOR CONTROLLING A QUALITY OF SERVICE IN A MOBILE COMMUNICATIONS SYSTEM

(75) Inventor: Mikko Puuskari, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/646,460

(22) PCT Filed: Mar. 18, 1999

(86) PCT No.: PCT/FI99/00212

§ 371 (c)(1), (2), (4) Date: Sep. 19, 2000

(87) PCT Pub. No.: WO99/48310

PCT Pub. Date: Sep. 23, 1999

(30) Foreign Application Priority Data

Mar. 19, 1998 (FI) .................................................. 980617

(51) Int. Cl.[7] .......................... G01R 31/08; G06F 11/00; G08C 15/00; H04J 1/16; H04J 3/14; H04L 1/00; H04L 12/26; H04L 12/28

(52) U.S. Cl. ..................... 370/230.1; 370/338; 370/352; 370/395.4; 370/395.21; 370/395.42; 370/395.52; 370/401; 370/469

(58) Field of Search .......................... 370/395.21, 395.4, 370/395.42, 395.5, 395.52, 352, 349, 469, 338, 401, 230, 230.1, 235

(56) References Cited

U.S. PATENT DOCUMENTS

| | | | | |
|---|---|---|---|---|
| 5,311,513 A | * | 5/1994 | Ahmadi et al. ............. 370/230 |
| 5,497,371 A | * | 3/1996 | Ellis et al. .................. 370/412 |
| 5,684,791 A | * | 11/1997 | Raychaudhuri et al. ... 370/310.2 |
| 5,745,380 A | * | 4/1998 | Sandvoss et al. .......... 379/90.01 |
| 5,771,459 A | * | 6/1998 | Demery et al. ............. 455/517 |
| 5,787,080 A | * | 7/1998 | Hulyalkar et al. ........ 370/310.2 |
| 5,956,341 A | * | 9/1999 | Galand et al. .............. 370/412 |
| 5,970,062 A | * | 10/1999 | Bauchot .................. 370/310.2 |
| 6,011,776 A | * | 1/2000 | Berthaud et al. ........... 370/232 |
| 6,023,456 A | * | 2/2000 | Chapman et al. ........... 370/252 |
| 6,026,082 A | * | 2/2000 | Astrin ........................ 370/336 |
| 6,084,888 A | * | 7/2000 | Watanabe et al. ........... 370/473 |
| 6,157,614 A | * | 12/2000 | Pasternak et al. .......... 370/236 |
| 6,188,670 B1 | * | 2/2001 | Lackman et al. ........... 370/231 |
| 6,412,006 B2 | * | 6/2002 | Naudus ....................... 709/227 |
| 6,477,141 B1 | * | 11/2002 | Izawa et al. ................ 370/219 |
| 6,487,212 B1 | * | 11/2002 | Erimli et al. ............... 370/413 |

FOREIGN PATENT DOCUMENTS

| | | |
|---|---|---|
| EP | 606 837 | 7/1994 |
| WO | WO 97 36405 | 10/1997 |
| WO | WO 98 53576 | 11/1998 |
| WO | WO 99 05828 | 2/1999 |

* cited by examiner

Primary Examiner—Nay Maung
Assistant Examiner—Sujatha Sharma
(74) Attorney, Agent, or Firm—Pillsbury Winthrop LLP (57) ABSTRACT

In a mobile communications system (BSS, SGSN, GGSN) having a packet data transmission capability, a dynamic packet-based quality of service (QoS) mechanism is provided within a "transmission tunnel" defined by a more static packet data protocol context (PDP context). More particularly, each data packet is arranged to carry at least one QoS parameter, and the scheduling and the policing of the transmission of the data packets is made in packet by packet basis according to this QoS information in the packets, while, however, within the limits set by the PDP context. This concept enables to have any number of QoS profiles in use simultaneously, e.g. a dedicated QoS profile for each of several Internet user applications run in the mobile station (MS) for a IP address. Therefore, the present invention provides support for various Internet applications and their QoS requirements. Moreover, the QoS can be changed at any time after activation of the PDP context, since only the QoS information in the relevant data packets has to be changed.

16 Claims, 1 Drawing Sheet

METHOD FOR CONTROLLING A QUALITY OF SERVICE IN A MOBILE COMMUNICATIONS SYSTEM

FIELD OF THE INVENTION

The invention relates to controlling the Quality of Service (QoS) in mobile communications systems having a packet data transmission capability.

BACKGROUND OF THE INVENTION

Mobile communications system refers generally to any telecommunications system which enable a wireless communication when users are moving within the service area of the system. A typical mobile communications system is a Public Land Mobile Network (PLMN).

Often the mobile communications network is an access network providing a user with a wireless access to external networks, hosts, or services offered by specific service providers.

The general packet radio service GPRS is a new service in the GSM system (Global system for mobile communications), and is one of the objects of the standardization work of the GSM phase 2+ at the ETSI (European Telecommunications Standards Institute). The GPRS operational environment comprises one or more subnetwork service areas, which are interconnected by a GPRS backbone network. A subnetwork comprises a number of packet data service nodes SN, which in this application will be referred to as serving GPRS support nodes SGSN, each of which is connected to the GSM mobile communication network (typically to base station systems) in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network PSPDN, via GPRS gateway support nodes GGSN. The GPRS service thus allows to provide packet data transmission between mobile data terminals and external data networks when the GSM network functions as an access network.

In order to access the GPRS services, a MS shall first make its presence known to the network by performing a GPRS attach. This operation establishes a logical link between the MS and the SGSN, and makes the MS available for SMS over GPRS, paging via SGSN, and notification of incoming GPRS data. More particularly, when the MS attaches to the GPRS network, i.e. in a GPRS attach procedure, the SGSN creates a mobility management context (MM context). Also the authentication of the user is carried out by the SGSN in the GPRS attach procedure. In order to send and receive GPRS data, the MS shall activate the packet data address that it wants to use, by requesting a PDP activation procedure contexts (PDP, Packet Data Protocol). This operation makes the MS known in the corresponding GGSN, and interworking with external data networks can commence. More, particularly a PDP context is created in the MS and the GGSN and the SGSN. The PDP context defines different data transmission parameters, such as the PDP type (e.g. X.25 or IP), PDP address (e.g. X.121 address), quality of service QoS and NSAPI (Network Service Access Point Identifier). The MS activates the PDP context with a specific message, Activate PDP Context Request, in which it gives information on the TLLI, PDP type, PDP address, required QoS and NSAPI, and optionally the access point name APN.

The quality of service QoS defines how the packet data units (PDUs) are handled during the transmission through the GPRS network. For example, the quality of service levels (QoS) defined for the PDP addresses control the order of transmission, buffering (the PDU queues) and discarding of the PDUs in the SGSN and the GGSN, especially in the congestion situation. Therefore, different quality of service levels will present different end-to-end delays, bit rates and numbers of lost PDUs, for example, for the end users.

For each PDP Address a different quality of service (QoS) may be requested. For example, some PDP addresses may be associated with E-mail that can tolerate lengthy response times. Other applications cannot tolerate delay and demand a very high level of throughput, interactive applications being one example. These different requirements are reflected in the QoS. If a QoS requirement is beyond the capabilities of a PLMN, the PLMN negotiates the QoS as close as possible to the requested QoS. The MS either accepts the negotiated QoS, or deactivates the PDP context.

Current GPRS QoS profile contains five parameters: service precedence, delay class, reliability, and mean and peak bit rates. Service precedence defines some kind of priority for the packets belonging to a certain PDP context. Delay class defines mean and maximum delays for the transfer of each data packet belonging to that context. Reliability in turn specifies whether acknowledged or unacknowledged services will be used at LLC and RLC (Radio Link Control) layers. In addition, it specifies whether protected mode should be used in case of unacknowledged service, and whether the GPRS backbone should use TCP or UDP to transfer data packets belonging to the PDP context. Furthermore, these varying QoS parameters are mapped to four QoS levels available at LLC layer.

There are various problems, drawbacks, undefined issues and open questions involved with the quality of service in the GPRS.

Firstly, the above mentioned mapping of GPRS QoS parameters to four QoS levels available at LLC layer is not well defined either. In addition, relationships between delay class and service precedence are not defined in the standard.

Secondly, the scheduling and policing based on current QoS Profile is rather difficult to implement (and unspecified in the standard). For example, how the network elements can guarantee the delay requirements? It is too expensive to employ timers to guarantee the required delay requirements. Moreover, the delay requirements are end-to-end requirements: How this end-to-end delay information can be used by GPRS network elements is not obvious either. In practice they cannot because information about the delay occurred in the previous network element is not conveyed to the next element (i.e. GSN). Also policing the negotiated mean and peak bit rates is rather difficult and would consume a lot of time and processing power. In addition, if we wanted to make sure that a certain bit rate could always be provided, we would have to reserve fixed capacity for that. This would however lead to inefficient link capacity usage.

Interpretation of mean bit rate is questionable. GPRS network cannot guarantee a certain mean bit for a user if he or she is not transmitting at fixed speed, ie. at the mean bit rate. Otherwise, the user could have an one hour connection in which he or she has not transmitted any data for the first 55 minutes. The user cannot assume that he or she could transmit data at much higher speed during the last 5 minutes in order to meet the mean bit rate requirement. Instead, the mean bit rate can only be guaranteed for the rest of the connection, i.e. for the last 5 minutes.

The GPRS network is not capable of meeting various QoS requirements of Internet applications. The IP (Internet Protocol) traffic goes between the mobile host and the fixed host located in an external network, e.g. in the Internet. Different Internet applications require different kind of service, i.e. QoS, from the underlying network. Thus, when the mobile host is using GPRS to access the Internet, GPRS network should be capable of meeting various QoS requirements of Internet applications. There are actually at least two IP traffic types that should be taken into account: real-time and non-real-time traffic. One example of real-time traffic is voice transmission. Email and file transfer in turn are examples of non-real-time applications.

Currently, QoS parameters can only be associated with a certain PDP context (i.e. a certain IP address). Setting different QoS values for different applications that use the same IP address is not therefore possible. This is a very severe drawback of the current scheme. The current GPRS specifications also define only very static QoS behaviour: QoS negotiation can only be initiated by the MS when activating the PDP context. To summarize the main problems: GPRS QoS scheme is too static, i.e. QoS cannot be changed the MS or the GGSN after the QoS has been negotiated for the first time, and secondly, all applications that use the same IP address must also use the same QoS Profile, i.e. the QoS values. This is obviously not enough for supporting requirements of various Internet applications and traffic streams, such as voice transmission, real-time video, compressed video, email transfer, file transfer, and high priority control information exchange.

Internet includes at the moment two different QoS schemes: Integrated Services and Differentiated Services. Integrated Services consists of three traffic types: Guaranteed Service, Controlled Load Service, and Best-Effort Service. Guaranteed Service is very difficult to provide without introducing much overhead to the system. This overhead comes from the fact that end-to-end traffic flows should be established for different application connections. Therefore, this requires much database management, control information exchange, and traffic policing to be performed by the system. Controlled Load providers unloaded network behaviour even under congestion situations. Controlled Load can be implemented by priorities. Therefore implementing Controlled Load Service would probably be easier than Guaranteed Service, which needs strict guarantees on transmission delays etc. Best-Effort Service does not need any guarantees on the QoS, and is thus very easy to implement in any network.

Differentiated Services in the Internet are based on the idea that no data flows are needed, but instead every data packet carries QoS information itself. This allows very flexible and easy way to provide a certain QoS to applications. The drawback is that 100% guarantees of the capacity cannot be given because no fixed capacity is ever allocated to a certain application flow. However, this scheme is much more efficient from the capacity and system point of view than the Integrated Services scheme.

Similar problems as describe above may arise in any mobile communications network.

An object of the present invention to introduce a new improved Quality of Service (QoS) scheme which is less complicated than the prior art QoS schemes, in mobile communications systems having a packet data transmission capability.

Another object of the present invention is a new Quality of Service (QoS) scheme which provides support for Internet applications and their QoS requirements for mobile communications systems having a packet data transmission capability.

An aspect of the present invention is a data transmission method.

Other aspects of the invention are a mobile communications system, a network element and a mobile station.

A still further aspect of the invention is a packet data communications network.

In the present invention a dynamic packet-based quality of service (QoS) mechanism is provided within a "transmission tunnel" defined by a more static packet data protocol context (PDP context). More particularly, each data packet is arranged to carry at least one QoS parameter, and the scheduling and the policing of the transmission of the data packets is made in packet by packet basis according to this QoS information in the packets, while, however, within the limits set by the PDP context. This concept enables to have any number of QoS profiles in use simultaneously, e.g. a dedicated QoS profile for each of several Internet user applications run in the mobile station for a IP address. Therefore, the present invention provides support for various Internet applications and their QoS requirements, which cannot be provided using the current QoS scheme of the GPRS, for example. Moreover, the QoS can be changed at any time after activation of the PDP context, since only the QoS information in the relevant data packets has to be changed. This overcomes the problems relating to the too static prior art QoS schemes. Further, the present invention introduces no or insignificant overhead into the mobile communications system as a whole.

In the preferred embodiment of the invention the QoS information associated with each data packet include at least a priority information and a traffic type information. The priority information has two or more values indicating the importance of the packet and thus also defines the order in which data packets should be handled or discarded in case of network congestion. The priority information may also define a Nominal Bit Rate as in SIMA approach. The traffic type indicates requirements for the transmission of the packet. At least two traffic types are typically defined: real-time and non-real-time traffic. However, more traffic types could be defined if needed. For example, for non-real-time traffic, the following subtypes could be used: control traffic, interactive traffic, attended bulk transfer, unattended data transfer, filler traffic, uncharacterized traffic, and best-effort traffic. The traffic type has an impact on retransmission strategies and data queueing in the network. For example, for real-time traffic, retransmissions of lost data packets are usually not needed, and it is often better to drop real-time data packets than to send them too late to the receiver.

In one embodiment of the invention also reliability is, instead of or in addition to being employed at PDP context level as is currently done in the prior art, directly associated with the QoS information in the data packet. The communications network, e.g at the LLC layer, is arranged to provide different connections each of which is associated with different reliability and QoS support. These connections may be provided in any one or several legs in the mobile communications network, e.g. at the radio interface and/or in a transmission link between two nodes in the network. One connection may be a connection oriented path having a higher reliability due to a retransmission protocol, for example, and another connection may be a connectionless path (e.g. using a User Datagram Protocol, UDP) having a lower reliability. Data packets are multiplexed over these connections based on the reliability and QoS information. The data packets requiring reliable transmission, should be sent over a reliable connection-oriented path. The data packets that do not require reliable connection-oriented path, should be sent over connectionless path. Both the connection-oriented and the connectionless path can be established to transfer packets of only one PDP tunnel or they can be used by several PDP tunnels. Furthermore, the establishment of different paths with different reliabilties can be dynamic or static (i.e. on demand or when the tunnel (PDP context) is created). This concept of the invention may applied in any packet data communications network, even in one not using any PDP context, such as TCP/IP, ATM, or X.25 networks.

As noted above, the PDP context defines a kind transmission tunnel with specific characteristics through a mobile communications network. As in the conventional networks, the parameters of the PDP context may include a PDP type (e.g. X.25 or IP), a PDP address (e.g. IP address), and a NSAPI (Network Service Point Identifier). The PDP context may or may not include also one or more QoS parameters. For example, mean and peak bit rate for the whole PDP context might or might not be used. The QoS of the PDP context may also include reliability. If both the PDP-level QoS Profile and the QoS in each data packet are to be used, the traffic policing may be based on the QoS values related to the PDP context, e.g. on mean and peak bit rate. Therefore, if the user is sending at too high speed, the priority of his or her data packets could be temporary decreased by the system. This guarantees that packets not conforming to the PDP level QoS contract are discarded first if needed. In addition, QoS information in data packets could be relevant only within the PDP context in question. This being the case, the QoS information in data packets is taken into account only in relation with the QoS Profile of the PDP context.

A further feature of the present invention may be a mapping of the QoS parameters used in the mobile-communication network to those used in a user application in said mobile packet data terminal or those used in said external communication system, and vice versa. The mapping is made for each packet entering or leaving the mobile communications system.

The QoS information in the data packets may be located in a packet header, in a lower layer protocol header, or as part of the data itself. The QoS controlling may also be based on the QoS information in QoS Profile, which is related to a certain PDP context, the priority and traffic type information included in the data packets, or both.

One embodiment of the invention involves also a charging of the users. Users can be charged, in addition to the normal PDP level attributes, by the priority and traffic type of data packets. This requires that the mobile communications network nodes, such as GSNs in the GPRS, collect information on the transferred data packets and their QoS and/or priority. On the other hand, invention also allows charging schemes that are using the normal PDP-level attributes, such as mean and peak bit rates of the PDP context, or a combination of these schemes.

In the preferred embodiment of the invention the mobile communications network is a packet radio network, such the General Packet Radio Service (GPRS) of GSM. The present invention may also be implemented in vendor-specific ways: data packets could include priority information although the current GPRS QoS Profile will still be used.

This invention will also apply to various future mobile networks, such as UMTS.

In the following, the invention will be described in greater detail by means of preferred embodiments with reference to the accompanying drawings, in which.

The present invention can be applied to any mobile communications system having a packet data transmission capability.

The term packet data protocol (PDP) as used herein should be understood to generally refer to any state in a mobile station and in one or more network element or functionality which state provides a data packet transmission path or a tunnel with a specific set of parameters through the mobile communications network. The term node as used herein should be understood to generally refer to any network element or functionality which handles the data packets transferred through the PDP channel.

The invention can be especially preferably used for providing a general packet radio service GPRS in the pan-European digital mobile communication system GSM (Global System for Mobile Communication) or in corresponding mobile communication systems, such as DCS1800 and PCS (Personal Communication System). In the following, the preferred embodiments of the invention will be described by means of a GPRS packet radio network formed by the GPRS service and the GSM system without limiting the invention to this particular packet radio system.

Figure 1:
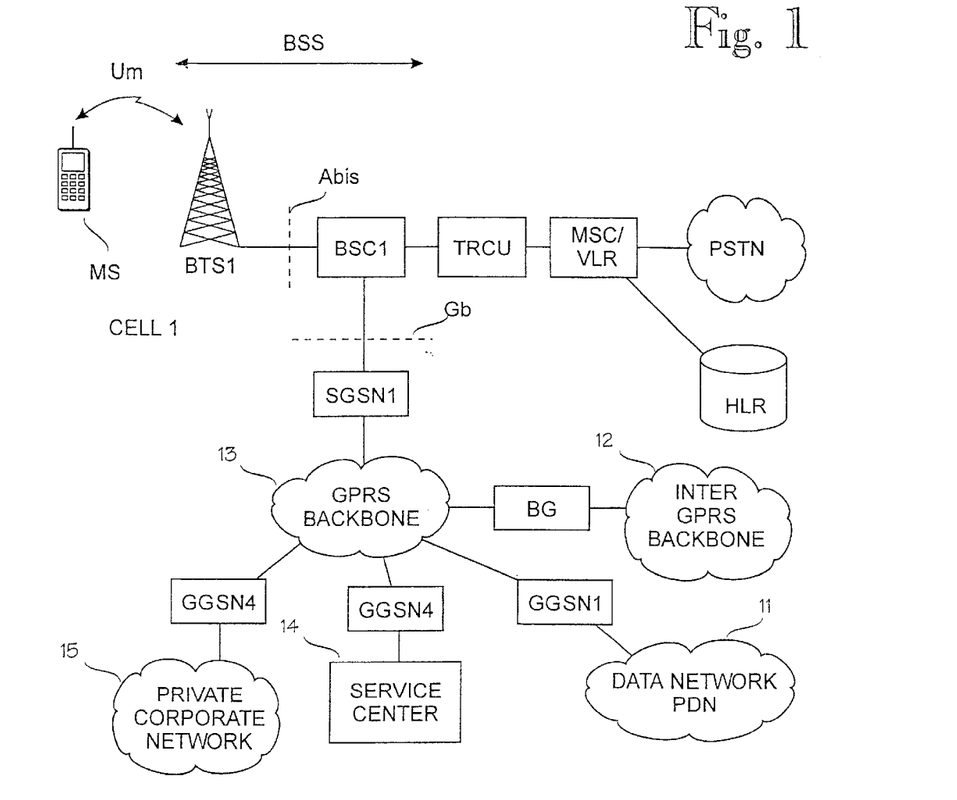
FIG. 1 illustrates a GPRS network architecture.

FIG. 1 illustrates a GPRS packet radio network implemented in the GSM system. For a more detailed description of the GPRS, a reference is made to ETSI GSM 03.60, version 5.1.0, and the cross-references thereof.

The basic structure of the GSM system comprises two elements: a base station system BSS and a network subsystem NSS. The BSS and mobile stations MS communicate over radio links. In the base station system BSS each cell is served by a base station BTS. A number of base stations are connected to a base station controller BSC, which controls the radio frequencies and channels used by the BTS. Base station controllers BSC are connected to a mobile services switching centre MSC. As regards a more detailed description of the GSM system, reference is made to the ETSI/GSM recommendations and The GSM System for Mobile Communications, M. Mouly and M. Pautet, Palaiseau, France, 1992, ISBN:2-957190-07-7.

In the figure the 1 GPRS system connected to the GSM network comprises one GPRS network, which in turn comprises one serving GPRS support node (SGSN) and several GPRS gateway support nodes (GGSN). The different support nodes SGSN and GGSN are interconnected by an intraoperator backbone network. It is important to realize that in the GPRS network there may be any number of serving support nodes and gateway support nodes.

The serving GPRS support node SGSN is a node which serves the mobile station MS. Each support node SGSN controls a packet data service within the area of one or more cells in a cellular packet radio network, and therefore, each support node SGSN is connected (Gb interface) to a certain local element of the GSM system. This connection is typically established to the base station system BSS, i.e. to base station controllers BSC or to a base station BTS. The mobile station MS located in a cell communicates with a base station BTS over a radio interface and further with the support node SGSN to the service area of which the cell belongs through the mobile communication network. In principle, the mobile communication network between the support node SGSN and the mobile station MS only relays packets between these two. To realize this the mobile communication network provides packet-switched transmission of data packets between the mobile station MS and the serving support node SGSN. It has to be noted that the mobile communication network only provides a physical connection between the mobile station MS and the support node SGSN, and thus its exact function and structure is not significant with respect to the invention. The SGSN is also provided with a signalling interface Gs to the visitor location register VLR of the mobile communication network and/or to the mobile services switching centre, e.g. signalling connection SS7. The SGSN may transmit location information to the MSC/VLR and/or receive requests for searching for a GPRS subscriber from the MSC/VLR.

The GPRS gateway support nodes GGSN connect an operator's GPRS network to external systems, such as other operators' GPRS systems, data networks 11–12, such as IP network (Internet) or X.25 network, and service centers. A border gateway BG provides an access to an inter-operator GPRS backbone network. The GGSN may also be connected directly to a private corporate network or host. The GGSN includes GPRS subscribers' PDP addresses and routing information, i.e. SGSN addresses. Routing information is used for tunneling protocol data units PDU from data network 11 to the current switching point of the MS, i.e. to the serving SGSN. Functionalities of the SGSN and GGSN can be connected to the same physical node.

The home location register HLR of the GSM network contains GPRS subscriber data and routing information and maps the subscriber's IMSI into one or more pairs of the PDP type and PDP address. The HLR also maps each PDP type and PDP address pair into one or more GGSNs. The SGSN has a Gr interface to the HLR (a direct signalling connection or via an internal backbone network 13). The HLR of a roaming MS may be in a different mobile communication network than the serving SGSN.

An intra-operator backbone network 13, which interconnects an operator's SGSN and GGSN equipment can be implemented, for example, by means of a local network, such as an IP network. It should be noted that an operator's GPRS network can also be implemented without the intra-operator backbone network, e.g. by providing all features in one computer.

An inter-operator backbone network enables a communication between different operators' GPRS networks.

In order to access the GPRS services, a MS shall first make its presence known to the network by performing a GPRS attach. This operation establishes a logical link between the MS and the SGSN, and makes the MS available for SMS over GPRS, paging via SGSN, and notification of incoming GPRS data. More particularly, when the MS attaches to the GPRS network, i.e. in a GPRS attach procedure, the SGSN creates a mobility management context (MM context). Also the authentication of the user is carried out by the SGSN in the GPRS attach procedure.

In order to send and receive GPRS data, the MS shall activate the packet data address that it wants to use, by requesting a PDP activation procedure. This operation makes the MS known in the corresponding GGSN, and interworking with external data networks can commence. More, particularly a PDP context is created in the MS and the GGSN and the SGSN.

As a consequence, three different MM states of the MS are typical of the mobility management (MM) of a GPRS subscriber: idle state, standby state and ready state. Each state represents a specific functionality and information level, which has been allocated to the MS and SGSN. Information sets related to these states, called MM contexts, are stored in the SGSN and MS. The context of the SGSN contains subscriber data, such as the subscriber's IMSI, TLLI and location and routing information, etc.

In the idle state the MS cannot be reached from the GPRS network, and no dynamic information on the current state or location of the MS, i.e. the MM context, is maintained in the network. In the standby and ready states the MS is attached to the GPRS network. In the GPRS network, a dynamic MM context has been created for the MS, and a logical link LLC (Logical Link Control) established between the MS and the SGSN in a protocol layer. The ready state is the actual data transmission state, in which the MS can transmit and receive user data.

In the standby and ready states the MS may also have one or more PDP contexts (Packet Data Protocol), which are stored in the serving SGSN in connection with the MM context. The PDP context defines different data transmission parameters, such as the PDP type (e.g. X.25 or IP), PDP address (e.g. X.121 address), quality of service QoS and NSAPI (Network Service Access Point Identifier). The MS activates the PDU context with a specific message, Activate PDP Context Request, in which it gives information on the TLLI, PDP type, PDP address, required QoS and NSAPI, and optionally the access point name APN. When the MS roams to the area of a new SGSN, the new SGSN requests MM and PDP contexts from the old SGSN.

Figure 2:
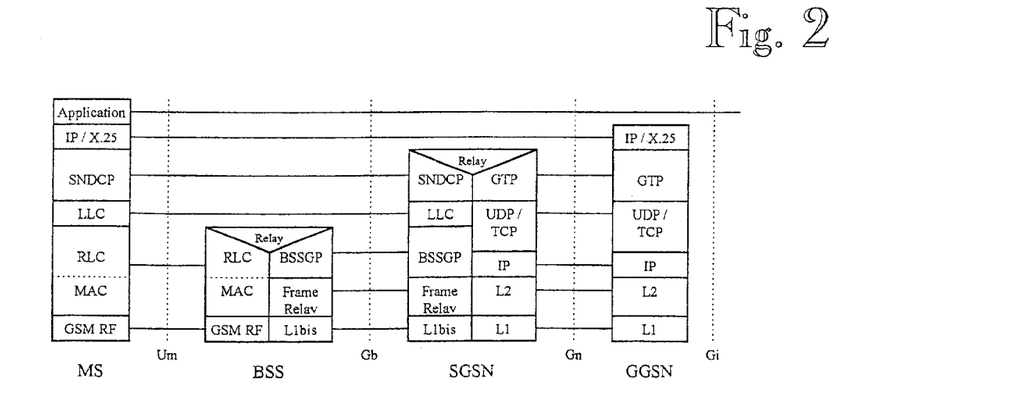
FIG. 2 illustrates a GPRS transmission plane.

For a signalling and a transfer of the user information, layered protocol structures, referred to a transmission plane and a signalling plane, are defined in the GPRS. The signalling plane consists of protocols for control and support of the transmission plane functions. The transmission plane which is shown in FIG. 2 consists of a layered protocol structure providing user information transfer, along with associated information transfer control procedures (e.g., flow control, error detection, error correction and error recovery). The transmission plane independence of the Network Subsystem (NSS) platform from the underlying radio interface is preserved via the Gb interface. GPRS Tunnelling Protocol (GTP): This protocol tunnels user data and signalling between GPRS Support Nodes in the GPRS backbone network. All PTP PDP PDUs shall be encapsulated by the GPRS Tunnelling Protocol. GTP shall provide mechanisms for flow control between GSNs, if required. GTP is specified in GSM 09.60.

TCP carries GTP PDUs in the GPRS backbone network for protocols that need a reliable data link (e.g., X.25), and UDP carries GTP PDUs for protocols that do not need a reliable data link (e.g., IP). TCP provides flow control and protection against lost and corrupted GTP PDUs. UDP provides protection against corrupted GTP PDUs. TCP is defined in RFC 793. UDP is defined in RFC 768.

IP is the GPRS backbone network protocol used for routeing user data and control signalling. The GPRS backbone network may initially be based on the IP version 4 protocol. Ultimately, IP version 6 shall be used. IP version 4 is defined in RFC 791.

Subnetwork Dependent Convergence Protocol (SNDCP) is a transmission functionality maps network-level characteristics onto the characteristics of the underlying network. SNDCP is specified in GSM 04.65.

Logical Link Control (LLC) provides a highly reliable ciphered logical link. LLC shall be independent of the underlying radio interface protocols in order to allow introduction of alternative GPRS radio solutions with minimum changes to the NSS. LLC is specified in GSM 04.64.

Relay function relays LLC PDUs between the Um and Gb interfaces n the BSS. In the SGSN, the Relay function relays PDP PDUs between the Gb and Gn interfaces.

Base Station System GPRS Protocol (BSSGP): This layer conveys routing- and QoS-related information between BSS and SGSN. BSSGP is specified in GSM 08.18. Frame Relay layer transports BSSGP PDUs.

RLC/MAC layer contains two functions: The Radio Link Control function provides a radio-solution-dependent reliable link. The Medium Access Control function controls the access signalling (request and grant) procedures for the radio channel, and the mapping of LLC frames onto the GSM physical channel. RLC/MAC is described in GSM 03.64.

Various identities are employed in the GPRS. A unique International Mobile Subscriber Identity (IMSI) shall be allocated to each mobile subscriber in GSM. This is also the case for GPRS-only mobile subscribers. A GPRS subscriber identified by an IMSI, shall have one or more network layer addresses, i.e., PDP addresses, temporarily and/or permanently associated with it that conforms to the standard addressing scheme of the respective network layer service used. PDP address may be a IP address or a X.121 address. PDP addresses are activated and deactivated through MM procedures described above.

The Network layer Service Access Point Identifier (NSAPI) and Temporary Logical Link Identity (TLLI) are used for network layer routeing. A NSAPI/TLLI pair is unambiguous within a routeing area. In the MS, NSAPI identifies the PDP service access point (PDP-SAP). In the SGSN and GGSN, NSAPI identifies the PDP context associated with a PDP address. Between the MS and SGSN, TLLI unambiguously identifies the logical link. NSAPI is a part of the tunnel identifier (TID). TID is used by the GPRS Tunnelling protocol between GSNs to identify a PDP context. A TID consists of an IMSI and a NSAPI. The combination of IMSI and NSAPI uniquely identifies a single PDP context. The TID is forwarded to the GGSN upon PDP Context Activation and it is used in subsequent tunnelling of user data between the GGSN and the SGSN to identify the MS's PDP contexts in the SGSN and GGSN. The TID is also used to forward N-PDUs from the old SGSN to the new SGSN at and after an inter SGSN routeing update.

Each SGSN and GGSN have an IP address, either of type IPv4 (an IP version 4 address) or IPv6 (an IP version 6 address), for inter-communication over the GPRS backbone network. For the GGSN, this IP address corresponds also to a logical GSN name.

GPRS transparently transports PDP PDUs between external networks and MSs. Between the SGSN and the GGSN, PDP PDUs are routed and transferred with the IP protocol. The GPRS Tunnelling Protocol transfers data through tunnels. A tunnel is identified by a tunnel identifier (TID) and a GSN address. All PDP PDUs are encapsulated and decapsulated for GPRS routeing purposes. Encapsulation functionality exists at the MS, at the SGSN, and at the GGSN. Encapsulation allows PDP PDUs to be delivered to and associated with the correct PDP context in the MS, the SGSN, or the GGSN. Two different encapsulation schemes are used; one for the GPRS backbone network between two GSNs, and one for the GPRS connection between SGSN and MS.

Between SGSN and GGSN, the GPRS backbone network encapsulates a PDP PDU with a GPRS Tunnelling Protocol header, and inserts this GTP PDU in a TCP PDU or UDP PDU that again is inserted in an IP PDU. The IP and GTP PDU headers contain the GSN addresses and tunnel endpoint identifier necessary to uniquely address a GSN PDP context.

Between SGSN and MS, a SGSN or MS PDP context is uniquely addressed with a TLLI and a NSAPI pair. TLLI is assigned when the MS initiates the Attach function. NSAPIs are assigned when the MS initiates the PDP Context Activation function.

The quality of service (QoS) information is employed in various nodes in the GPRS system for scheduling and policing the transmission of the data packets. As noted above, in the present GPRS specifications QoS is associated with the PDP which result in various problems described above. According to the present invention the QoS information is, at least partly, associated with each data packet so that the scheduling and policing can be done in packet by packet basis. More particularly, each data packet is arranged to carry at least one QoS parameter, and the scheduling and the policing of the transmission of the data packets is made in packet by packet basis according to this QoS information in the packets, while, however, within a "transmission tunnel" defined by the PDP context.

In the preferred embodiment of the invention the QoS information associated with each data packet include at least a priority information and a traffic type information, and optionally, a reliability information. The priority information has two or more values indicating the importance of the packet and thus also defines the order in which data packets should be handled or discarded in case of network congestion. The priority information may also define a Nominal Bit Rate as in SIMA approach. The traffic type indicates requirements for the transmission of the packet. At least two traffic types are typically defined: real-time and non-real-time traffic. However, more traffic types could be defined if needed.

Adoption of the preferred embodiment of the invention requires typically the following modifications to be done for GPRS specifications:

1) SNDCP and GTP headers should carry additional bits for transmitting QoS information, such as priority and/or traffic class information and/or reliability information, (GTP bits are needed on both directions, SNDCP bits could in certain cases be used only for uplink data); In addition, IPv4's Type-of-Service field or IPv6's priority field or Traffic Class field could be used in the GPRS backbone if it is wanted that IP routers etc. also support prioritization of packets and QoS-based queueing or scheduling. IPv6 traffic flows may be established to transmit data belonging to certain traffic types. It could also be possible that no extra bits be allocated in GTP headers, but that the class information is carried by lower layers. For example, if the underlying GPRS backbone network supports differentiated services, this information can be included in IP or some other lower layer protocol header. This being the case, the SGSN and the GGSN should be capable of recovering this lower layer information in order to reuse it. The QoS information can be added to data packets at the Gb interface as well, eg. to BSSGP protocol messages. Then the QoS information can be mapped to Frame Relay or ATM concepts at SGSN and BSS.

2) PDP contexts are multiplexed over several LLC SAPIs, if also reliability is used as a QoS parameter. In other words, SNDC layer should be capable of multiplexing NSAPI on several SAPIs at the LLC layer, as will be described in more detail below.

3) Adoption of this invention does not require any modifications to the lower radio interface protocols, like RLC. However, radio interface protocols could be replaced later with newer protocols. The present invention is applicable also in such case and similar QoS support (prioritization, traffic type/delays) to the one described herein could inherently be implemented into those radio protocols.

After these modifications a mapping between differentiated services in the Internet and in GPRS may be provided as follows, for example:

priority information in the Internet is mapped to service precedence in GPRS.

real-time/non-real-time requirements in the Internet is mapped to delay class in GPRS: at least two delay types are needed, but mapping of traffic types more precisely to several delay classes is also possible.

The reliability information, if it is added to data packets in addition to priority and/or traffic class information, indicates the reliability requirements of each application in form of one of at least two reliability classes in the preferred embodiment of the invention. If reliable transmission is needed (retransmissions, checksums, TCP), data packets are carrying reliablity class 1 information. If reliable delivery over the radio interface is needed, but UDP in the GPRS backbone is enough, data packets are carrying reliability class 2 information. Depending on the requirements, packets may alternatively carry reliability class 3, 4 or 5 information. Reliability classes 4 and 5 will be used for real-time traffic.

A further feature of the present invention may be a mapping of the QoS parameters used in the mobile-communication network to those used in a user application in said mobile packet data terminal or those used in said external communication system, and vice versa. The mapping is made for each packet entering or leaving the mobile communications system. In the following, two examples of the mapping will be given.

EXAMPLE 1

Simple Integrated Media Access (SIMA) is a new simple approach presented as a Internet-Draft by K. Kilkki, Nokia Research Center, June 1997. Internet-Drafts are working documents of the Internet Engineering Task Force (IETF), its areas, and working groups. Since SIMA is one potential way to provide a uniform service concept for different needs from file transfer applications using TCP/IP protocol without loose delay and packet loss requirements to real-time applications with very strict quality and availability requirements, it is chosen herein as an example of a Internet QoS scheme. According to the SIMA concept each user shall define only two issues before the connection setup: a nominal bit rate (NBR) and the selection between real-time and non-real-time service classes. NBR may have eight values 0–7. Mapping of parameters from SIMA to GPRS and vice versa may be as follows, for example:

Real-time/non-real-time bit: if this bit indicates real-time requirements, it is mapped to GPRS delay class 1, otherwise it is mapped to delay class 4. However, delay class 3 may be used for non-real-time services in case there is a special way to indicate best-effort traffic, e.g. this bit shall not always be present or a more precise definition is used to differentiate real-time, non-real-time, and best-effort traffic. A lower Reliability Class value may be assigned to real-time traffic than to non-real-time traffic in GPRS. Generally, Reliability classes 1, 2, and 3 are usually used for non-real-time traffic and classes 3, 4, and 5 for real-time traffic in GPRS. For non-real-time traffic, the higher the NBR is, the lower Reliability Class value is suitable for transmission.

Nominal Bit Rate values 6 and 7 are mapped to GPRS Service Precedence parameter having value 1.

Nominal Bit Rate values 3, 4, and 5 are mapped to GPRS Service Precedence parameter having value 2.

Nominal Bit Rate values 0, 1, and 2 are mapped to GPRS Service Precedence value 3.

It should be noted that the Service precedence and the Delay class parameters have here a little different meaning than in the current GPRS specifications, where those parameters are associated with PDP contexts, not with each data packet. Thus, different names, such as priority or Nominal Bit Rate and traffic type, may also be chosen for the parameters. The QoS Profile may include all the existing parameters (service precedence, reliability class, delay class, mean bit rate and peak bit rate). Alternatively, it could only include part of the parameters, such as only the mean and peak bit rate. QoS Profile could also include a maximum burst size parameters to ease buffer allocation procedure.

QoS scheduling in GPRS network elements (e.g. in SGSN and GGSN) is based on the delay class, as well as are the decisions to discard aged real-time packets. This requires that at least two buffers should exist (and at most as many as there are different delay classes): one for real-time packets (this buffer should be much smaller!) and the other one for non-real-time packets. Real-time traffic should always be sent before non-real-time traffic. Service precendence defines the order in which packets can be dropped in case of network congestion.

EXAMPLE 2

Mapping Type of Service (ToS) octet in the headers of IP PDUs to GPRS packet attributes. Type of Service octet in IP headers is not widely used at the moment. Its original purpose was to include traffic type information and to specify what kind of service is required from the packet delivery. Because the ToS octet is not in common use nowadays, it is possible to redefine the bits in that octet for the purposes of the present invention. Definition of ToS octet is given in RFC 791. Bits 0–2 of ToS give the preference, bits 3–5 give the ToS required by the packet (e.g. delay, throughput, and reliability levels requested), and bits 6–7 are reserved for future use. RFC 1349 extends the ToS field by one bit (taken from the "reserved for future" bits). Thus, 4 bits can be used to indicate the ToS.

Mapping between the precedence bits (0–2 in ToS) and GPRS service precedence may be as follows:

bit values 111 and 110 are mapped to service precedence value 001 (highest priority) in GPRS.

bit values 101, 100, and 011 are mapped to service precedence value 010 (normal priority) in GPRS.

bit values 010, 001, and 000 are mapped to service precedence value 011 (lowest priority) in GPRS.

There are three different ways to perform the mapping between the traffic type information (i.e. ToS field in the ToS octet) and the GPRS delay class:

If only the bit 3 in the ToS field is used to indicate the delay requirements in IP header: value 0 of bit 2 is mapped to GPRS delay class 2 and value 1 of the bit 2 is mapped to GPRS delay class 4 (best effort).

If the whole ToS field in ToS is utilized for indicating delay requirements, i.e., 4 bits (bits 3–6) are available for that purpose, one possible mapping could be: bit value 1000 is mapped to GPRS delay class 1 (i.e. to bit value 000), bit value 0100 to GPRS delay class 2 (i.e. to value 001), ToS values 0010 and 0001 to GPRS delay class 3 (i.e. to value 010), and the ToS value 0000 to GPRS delay class 4 (i.e. to value 011).

Another way of mapping IP's ToS bits to GPRS delay classes would be: 11x to delay class 1, 10x to delay class 2, 01x to delay class 3, and 00x to delay class 4. In this case, x means that there might be one or more additional bits used for ToS, but they do not have any impact on the process of selecting the GPRS delay class. If more delay classes will be defined for GPRS later, the mapping could take into account also those additional bits.

Currently there is also one bit in the IP ToS field specifying the wanted reliability level. If this bit is still available in the future, e.g., if the first choice above is chosen, this bit could carry reliability information and could be mapped to GPRS reliability class in the following way: a value 0 in bit 5 inside the ToS octet is mapped to the reliability class 000 (subscribed reliability class) and a value 1 is mapped to the reliability class 001 (defining the most reliable service). The use of that bit may however be too vague because the GPRS defines many other reliability levels as well and this cannot be expressed using only one bit.

The mapping described above in the Example 2 may be applied in a rather similar way in IPv6. The name of the appropriate field is then Traffic Class instead of ToS.

In the following the operation of a GPRS mobile station and GPRS network elements, as well as Integration with external network QoS concepts, when the inventive QoS concept is employed, will be described in more detail.

The MS, or more precisely software in the Terminal Equipment (e.g. in a laptop computer), and the GGSN provide mapping of external network QoS requirements to GPRS QoS mechanisms, and vice versa, as described in the above examples. Terminal Equipment (TE) could for example provide QoS functions through an Application Programming Interface (API). The application-level software may include ToS information into the data packets, e.g. inside the IP header, itself, or it can use the API to deliver the ToS information to lower layers. If it does not do either, the GPRS-specific software should add priority and traffic type information to data packets based on the information available. The software may, for example, decide the traffic type and QoS based on the used source and destination IP addresses, or the source and destination port numbers. Priority and traffic type information is included in every uplink data packet by the MS. This information may be included in the ToS or Traffic Class octet of the IPv4 or IPv6 header. Alternatively, this information may be carried between the Terminal Equipment and the Mobile Terminal via GPRS specific mechanisms, or in PPP vendor-specific packets/options. In addition, MS might interpret QoS information included in downlink data packets and deliver this information to applications (possibly after changing the format of information).

For Mobile Originated (MO) data, the Mobile Station (MS) schedules data packets based on the ToS information received from the application or from the GPRS protocol suite in the Terminal Equipment. The MS schedules the incoming MO packets according to their delay class. In the SNDC layer, the MS selects the appropriate LLC SAP (Service Access Point) based on the delay requirement. If delay class 1 service is requested, SAPI 3 is used. Otherwise, the SAP to be used is chosen as follows: for delay class 2 SAPI 5 is chosen, for delay class 3 SAPI 9 is chosen, and for delay class 4 SAPI 11 is chosen. The choice whether to use retransmissions or checksums at LLC/RLC level may depend on the reliability class of the packet. The reliability class defines either acknowledged or unacknowledged service of LLC, RLC, and GTP. Scheduling in the lower layers is performed in accordance with the service precedence of the corresponding packet. In addition, the MS adds the correct type of service and QoS information to the SNDCP data packets. This information may be included in the first data octet (or in the first two octets, if all three parameters, the service precedence, the delay class, and the reliability class are included). This octet comes after the DCOMP and PCOMP values in SN-Data PDUs and after the N-PDU number in SN-Unitdata PDUs.

The MS may also perform policing of the negotiated PDP context attributes of the QoS profile. It may drop non-conformant packets or change the service precedence (i.e. the priority) of those packets to the worst possible, i.e. to indicate best-effort. In addition to the MS, SGSNs may perform traffic policing according to the negotiated PDP context QoS attributes. Network nodes may police the throughput levels and the used delay classes, reliability classes and service precedence values. Values negotiated for the PDP context may be interpreted as maximum allowed values for the packet attributes. PDP context QoS attributes may form the basis for charging,. On the other hand, packet level QoS may also be taken into account when billing the user. This would most likely mean that there were a different counter for each data packet type in order to be able to count how many expensive and how many cheap data packets the user has sent.

If both reliable and unreliable paths are employed between the MS and the SGSN, it is required that the LLC layer multiplexes several NSAPI of one user onto several SAPIs in the MS and SGSN. Logical Link Entities (LLE) may establish all connections, i.e. the SAPIs, beforehand or only on demand. These SAPIs/links should not be teared down immediately after serving one request. A timer, for example, may control the tearing down of LLC connections associated with SAPIs. The SNDC layer decides, based on the TLLI and the delay class or optionally also the reliability class, which SAPI it will use to transfer the packet in question. The SNDC layer can perform segmentation of SN-PDUs as usual. Then, the SNDC layer gives the packet to the LLC layer using the appropriate SAP. The LLC layer transmits the packet over the LLC/radio connection as usual. At the other end, the SNDC layer receives packets from the different LLEs and associates them with the correct NSAPIs. Ordering of packets is not essential because packets using different QoS either belong to different application-level connections or are reordered based on their QoS values, which is the purpose of QoS values in the first place.

The SGSN takes the traffic class information, i.e. the service precedence, the delay class, and the reliability class, out the uplink SNDCP packet, and schedules the packets based on their delay class. There are different buffers for each delay class. The lower the delay class is, the smaller the size of a buffer allocated for queueing the concerned packet class should be. This is because some packets are delay sensitive, and thus cannot cope with long queueing delays. Lower delay classes are always sent before any higher delay class packets. Each buffer, i.e. a queue, may have a threshold value defined. When this threshold value is exceeded, the incoming packets (of the concerned class) having a low service precedence value may be discarded. SGSN may maintain both reliable and unreliable paths to GGSNs. These paths might be dedicated to a certain user/tunnel, or several users and tunnels might be multiplexed onto the same paths. The right path for delivering each data packet is selected based on the reliability class information included in the packet, or based on default values if there is not enough information in the packet to make a decision. Reliable connection-oriented path is chosed for reliability class 1, and connectionless path for other reliability classes. SGSN adds traffic type information to GTP headers. This information may be included in the eighth octet of the header (currently reserved for future use). This octet might include for example the service precedence and the delay class information. In case the reliability class information is also carried in every data packet, bits 2–5 of the first octet of the GTP header can be taken into use. These bits may contain either this reliability class information or information on one of the other parameters as well.

The GGSN recovers the QoS information from the uplink GTP header. It may also perform traffic policing. The GGSN may perform charging functions and may utilize the packet QoS information for that purpose, too.

The GGSN, or an external host, may provide a mapping between the external data network QoS definitions and the GPRS QoS, and vice versa. This applies both for uplink and downlink data delivery.

For Mobile Terminated (MT) data packets, the same procedure applies, only the transmission direction is reversed. In this case, it is the GGSN who selects the appropriate GTP path, the SGSN looks inside the downlink GTP header in order to find the traffic type and QoS information. The SGSN also adds the QoS information to downlink SNDCP packets, makes the scheduling based on packet delay classes, and decides the correct LLC SAPI to be used. The Mobile Terminal may change the application's IP header in order to inform the Terminal Equipment (TE) of the QoS of the downlink data packet. Alternatively, the MS might use some GPRS or PPP specific mechanisms for delivering the same information to the TE. Scheduling and policing operations inside the network elements are basically the same in both directions.

As noted above, for uplink data, the GGSN, or an external host, modifies the GPRS QoS information to the QoS concepts available in the external packet data network. Similarly, for downlink data, the GGSN, or an external host, should translate the external network QoS into the GPRS QoS definitions in each data packet. The GGSN, or an external host, may optionally maintain information about different application connections and traffic flows, but this is not required. The GGSN, or an external host, may decide the priority and traffic type of each data packet based on this flow information. The flow information can be obtained for example via a RSVP signalling taken place in the network. The GGSN, or an external host, may response to external RSVP messages itself, or it may also pass the RSVP messages to the MS which may take part in the RSVP signalling. The capacity indicated in RSVP response messages should be in line with the priority and traffic type values used for data packets belonging to that flow or PDP context (related to which the GGSN, or an external host, maintains QoS information). Fixed capacity reservations are not required inside the GPRS network. To indicate this, the GGSN, or an external host, may set the Global Break Bit or the Break Bit in the RSVP messages. (These break bits indicate that there is at least one network element along the path who cannot entirely guarantee the QoS requested.)

As described in the examples above, the Differentiated Services in the Internet, like SIMA approach, can be mapped quite easily to these new GPRS QoS concepts. Best-Effort Service may be specified as non-real-time traffic with a low priority. The Integrated Services are usually associated with traffic flows. The Guaranteed Service can thus be defined as with the RSVP: the GGSN, or an external host, and the MS on the other side, may act like some fixed capacity would have been reserved for a flow or IP context and can set "break bits" of the RSVP messages, if necessary. The Controlled Load traffic may be supported without any flows: the QoS information can be included directly into the data packets. Also in this case, the GGSN, or an external host, and the MS may optionally maintain QoS information related to application traffic flows and add the appropriate QoS information to the data packets based on this maintained flow information. During the RSVP negotiation, the GPRS system may indicate that it cannot support various token bucket sizes or maximum packet sizes. Thus, it may require that those parameters are set to conform to the supported values before it will accept the RSVP reservations. The MS, the SGSN, the GGSN or an external host may also know how many high priority flows (the amount of delay class 1 packets) the GPRS can support and make a decision on the acceptance of each reservation request based on this information.

Also ATM (Asynchronous Transfer Mode) or X.25 can be used as an external data network or as a transmission medium to convey the GPRS signalling and data traffic. The ATM Constant Bit Rate (CBR) and real-time Variable Bit Rate (r-VBR) traffic may be mapped to real-time traffic class and the other ATM traffic classes to non-real-time traffic. Priority may be decised based on both the used traffic class (non-real-time Variable Bit Rate, Alternative Bit Rate, or Unspecified Bit Rate) and other connection-related parameters, such as mean and maximum bit rate.

IP networks will be used as an underlying transmission network in the GPRS backbone. The GPRS QoS concepts may be mapped to the Type-Of-Service parameter in the IPv4, or to the Priority/Traffic Class field in the IPv6, and vice versa. The flows in the IPv6 can also be used to reserve a certain kind of capacity and to handle certain traffic types, application connections, or PDP contexts. If the external Internet network also employs these methods, the GGSN, or an external host, could perform mapping of concepts similarly between the GPRS network and the Internet.

Similarly as described above with respect to the GPRS, the present invention can be applied in any mobile communications network. A potential mobile networks in which the principles of the present invention may be applied are the third generation mobile communications systems, such as the Universal Mobile Communications System (UMTS) and the Future Public Mobile Telecommunication System (FPLMTS), or IMT-2000, or the Cellular Digital Packet Data (CDPD).

The description only illustrates preferred embodiments of the invention. The invention is not, however, limited to these examples, but it may vary within the scope and spirit of the appended claims.

What is claimed is:

1. A data transmission method for a mobile communications system having a packet data transmission capability, comprising:
   providing in the mobile communications network at least one connection leg with at least two paths having different reliabilities, said at least two paths including a User Datagram Protocol path with a lower reliability and a Transmission Control Protocol path with a higher reliability;

setting up a single packet data protocol context for a mobile packet data terminal for routing data packets through the mobile communications system between said mobile packet data terminal and an external communication system;

transmitting, within said single packet data protocol context, data packets of at least two user applications run in said mobile packet data terminal;

providing each individual data packet with priority information and traffic type information as quality of service parameters, the priority information indicating one of at least two priority levels and the traffic type information indicating one of at least two traffic types;

scheduling and policing the transmission of each respective data packet according to said at least one quality of service parameter carried in said respective data packet, within the limits set by said packet data protocol context;

providing each individual data packet with reliability information as a further quality of service parameter, said reliability information defining one of at least two reliability classes; and multiplexing the data packets to said at least two paths according to said reliability information carried in said data packets.

2. A method as claimed in claim 1, further comprising:

providing in the mobile communications network at least one connection leg with a connectionless path and a connection-oriented path having different reliabilities;

sending a data packet in which the reliability information indicates that a reliable transmission is needed, over said connection-oriented path; and sending a data packet in which the reliability information indicates that a less reliable transmission is needed, over said connectionless path.

3. Method as claimed in claim 1, wherein said mobile communications system is a packet radio network comprising serving nodes, gateway nodes and a data network interconnecting said serving nodes and gateway nodes.

4. A data transmission method for a mobile communications system including packet radio serving nodes, packet radio gateway nodes and an IP data network interconnecting said packet radio serving nodes and packet radio gateway nodes, having a packet data transmission capability, said method comprising:

setting up a single packet data protocol context in one of the packet radio gateway nodes for a mobile packet data terminal for routing data packets through the mobile communications system between said mobile packet data terminal and an external communication system;

transmitting, within said single packet data protocol context, data packets of at least two user applications run in said mobile packet data terminal;

providing each individual data packet with priority information and traffic type information as quality of service parameters, the priority information indicating one of at least two priority levels and the traffic type information indicating one of at least two traffic types, said at least two traffic types including a real-time traffic and a non-real-time traffic;

defining at least one further quality of service parameter in said packet data protocol context said one packet radio gateway node;

scheduling and policing the transmission of each respective data packet in said mobile communication system according to said at least one quality of service parameter carried in said respective data packet, within the limits set by said at least one further quality of service parameter in said packet data protocol context; and mapping of quality of service parameters used in the mobile-communication system to those used in a user application in said mobile packet data terminal or those used in said external communication system, and vice versa.

5. A method as claimed in claim 4, wherein data packets associated with two or more packet data protocol contexts are multiplexed to said connectionless and connection-oriented paths in said at least one connection leg.

6. A method as claimed in claim 4, wherein said at least one further quality of service parameter includes one or more of the following: mean bit rate, peak bit rate, service precedence, delay class and reliability.

7. A method as claimed in claim 6, further comprising:

providing in the mobile communications network at least one connection leg with a connectionless path and a connection-oriented path having different reliabilities;

sending a data packet over said connection-oriented path when the reliability information in said packet data protocol context indicates that a reliable transmission is needed; and sending a data packet over said connectionless path when the reliability information in said packet data protocol context indicates that a less reliable transmission is needed.

8. A method as claimed in claim 6, further comprising:

monitoring the actual mean bit rate used by the mobile packet data terminal; and lowering the priority of the data packets of the mobile packet data terminal, if said actual mean bit rate exceeds a mean bit rate defined in said packet data protocol context.

9. A mobile communications system, comprising:

mobile packet data terminals;

a mobile communications network comprising packet radio serving nodes, packet radio gateway nodes providing an access to an external system, and an Internet Protocol data network interconnecting said packet radio serving nodes and packet radio gateway nodes;

at least one connection leg with at least two paths having different reliabilities in the mobile communications network;

means for setting up a packet data protocol context in one of said packet radio gateway nodes for a mobile packet data terminal for transmitting data packets through the mobile communications network between said mobile packet data terminal and an external communication system;

at least two user applications run in said mobile packet data terminal and transmitting data packets within a single packet data protocol context;

each individual data packet of each of said user applications carrying at least one quality of service parameter indicating the quality of service required by the respective user application;

each individual data packet carrying priority information and traffic type information as quality of service parameters, the priority information indicating one of at least two priority levels and the traffic type information indicating one of at least two traffic types;

each individual data packet carrying reliability information as a further quality of service parameter, said reliability information defining one of at least two reliability classes;

means for scheduling and policing responsive to said at least one quality of service parameter carried in each respective data packet for scheduling and policing the transmission of said respective data packet within the limits set by said packet data protocol context; and means for multiplexing the data packets to said at least two paths according to said reliability information carried in said data packets.

10. A system as claimed in claim 9, wherein said at least one further quality of service parameter includes one or more of the following: mean bit rate, peak bit rate, service precedence, delay class and reliability.

11. A system as claimed in claim 10, further comprising:

at least one connection leg with a connectionless path and a connection-oriented path having different reliabilities in the mobile communications network;

means for sending a data packet over said connection-oriented path when the reliability information in said packet data protocol context indicates that a reliable transmission is needed; and means for sending a data packet over said connectionless path when the reliability information in said packet data protocol context indicates that a less reliable transmission is needed.

12. A system as claimed in claim 10, further comprising:

means for monitoring the actual mean bit rate used by the mobile packet data terminal; and means for lowering the priority of the data packets of the mobile packet data terminal, if said actual mean bit rate exceeds a mean bit rate defined in said packet data protocol context.

13. A system as claimed in claim 9, further comprising means for mapping of quality of service parameters used in the mobile-communication network to those used in a user application in said mobile packet data terminal or those used in said external communication system, and vice versa.

14. A network element as claimed in claim 9, wherein said mobile communications comprises serving network elements and gateway network elements providing access points to external systems.

15. A mobile communications system, comprising:

mobile packet data terminals;

a mobile communications network comprising packet radio serving nodes, packet radio gateway nodes providing an access to an external system and an Internet Protocol data network interconnecting said packet radio serving nodes and packet radio gateway nodes;

means for setting up a packet data protocol context for a mobile packet data terminal for transmitting data packets through the mobile communications network between said mobile packet data terminal and an external communication system;

at least two user applications run in said mobile packet data terminal and transmitting data packets within a single packet data protocol context;

each individual data packet of each of said user applications carrying at least one quality of service parameter indicating the quality of service required by the respective user application;

each individual data packet carrying priority information and traffic type information as quality of service parameters, the priority information indicating one of at least two priority levels and the traffic type information indicating one of at least two traffic types, said at least two traffic types including a real-time traffic and a non-real-time traffic;

at least one further quality of service parameter defined in said packet data protocol context; and means for scheduling and policing responsive to said at least one quality of service parameter carried in each respective data packet for scheduling and policing the transmission of said respective data packet within the limits set by said at least one further quality of service parameter in said packet data protocol context; and means for mapping of quality of service parameters used in the mobile-communication network to those used in a user application in said mobile packet data terminal or those used in said external communication system, and vice versa.

16. A mobile station for a mobile communications system having a packet data transmission capability, including scheduling and policing means for scheduling and policing a transmission of Internet Protocol data packets over an air-interface within limits set by a packet data protocol context defined for said mobile station, the mobile station being configured to provide each individual IP data packet transmitted over the air-interface with at least one quality of service parameter, and that said means for scheduling and policing are responsive to said at least one quality of service parameter carried in each respective IP data packet for scheduling and policing the transmission of said respective IP data packet within the limits set by said packet data protocol context, and wherein the mobile station is arranged to convert quality of service parameters used by an application run in the mobile station into service parameters used in the mobile-communication system, and vice versa.

* * * * *